United States Patent
Lee et al.

(10) Patent No.: US 10,067,906 B2
(45) Date of Patent: Sep. 4, 2018

(54) COMPUTING DEVICE INCLUDING AN INTER-INTEGRATED CIRCUIT (I2C) COMMUNICATION MODULE AND A COMMUNICATION ERROR RECOVERY METHOD THEREOF

(71) Applicant: SAMSUNG ELECTRONICS CO., LTD., Suwon-si, Gyeonggi-do (KR)

(72) Inventors: Chul-Woo Lee, Suwon-si (KR); Hyunseok Kim, Seoul (KR); Sungjin Moon, Suwon-si (KR); Gyucheol Han, Suwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 138 days.

(21) Appl. No.: 15/057,456

(22) Filed: Mar. 1, 2016

(65) Prior Publication Data
US 2016/0357701 A1    Dec. 8, 2016

(30) Foreign Application Priority Data
Jun. 5, 2015 (KR) .................. 10-2015-0080026

(51) Int. Cl.
*G06F 13/42* (2006.01)
*G06F 1/24* (2006.01)

(52) U.S. Cl.
CPC ............ *G06F 13/4282* (2013.01); *G06F 1/24* (2013.01); *G06F 2213/0016* (2013.01)

(58) Field of Classification Search
CPC .... G06F 3/0604; G06F 3/0629; G06F 3/0653; G06F 3/0683; G06F 11/079; G06F 11/0751; G06F 11/073; G06F 11/1443; G06F 1/24; G06F 13/4282; G06F 2213/0016

See application file for complete search history.

(56) References Cited

U.S. PATENT DOCUMENTS

| 6,728,908 | B1 | 4/2004 | Fukuhara et al. |
| 8,301,809 | B2* | 10/2012 | Liu ............... G06F 3/0607 710/72 |
| 2014/0149617 | A1 | 5/2014 | Chiang et al. |
| 2014/0164680 | A1 | 6/2014 | Lai et al. |
| 2014/0244874 | A1 | 8/2014 | Erickson et al. |
| 2016/0202914 | A1* | 7/2016 | Hsu ............... G06F 3/0604 714/49 |

FOREIGN PATENT DOCUMENTS

KR    1020090094487    9/2009

* cited by examiner

*Primary Examiner* — Ernest Unelus
(74) *Attorney, Agent, or Firm* — F. Chau & Associates, LLC

(57) ABSTRACT

A computing device includes an inter-integrated circuit (I2C) module configured to perform I2C communication with an external device through a system management bus, a packet generator module configured to transmit a packet to the I2C module through the system management bus, and an I2C controller configured to control operations of the I2C module and the packet generator module. When the I2C module transmits a packet receiving signal to the I2C controller and the I2C controller does not receive the packet receiving signal for a set period of time, the I2C controller may reset the I2C module.

19 Claims, 8 Drawing Sheets

COMPUTING DEVICE INCLUDING AN INTER-INTEGRATED CIRCUIT (I2C) COMMUNICATION MODULE AND A COMMUNICATION ERROR RECOVERY METHOD THEREOF

CROSS-REFERENCE TO RELATED APPLICATION

This U.S. non-provisional patent application claims priority under 35 U.S.C. § 119 to Korean Patent Application No. 10-2015-0080026, filed on Jun. 5, 2015, the disclosure of which is incorporated by reference herein in its entirety.

TECHNICAL FIELD

The present inventive concept relates to computing devices and, more particularly, to a computing device including an inter-integrated circuit (I2C) communication module and a communication error recovery method thereof.

DISCUSSION OF RELATED ART

A computing device such as a desktop computer, a laptop computer, a smartphone, a media player, and a tablet computer includes integrated circuits (ICs). Since an IC is typically designed to perform a unique function, a large number of ICs having different functions are used to operate computing devices. To enable communication between ICs performing different functions, an I2C protocol may be used.

For example, a computing device may include an I2C interface for communication with an external device and may communicate with the external device in a master or slave mode under the control of an I2C controller. When the computing device operates in the slave mode and is communicating with the external device, a communication error may occur in an I2C module of the computing device. The communication error can result in a bus hang, thereby causing reliability of the I2C communication to be degraded.

SUMMARY

An exemplary embodiment of the present inventive concept provides a computing device that includes an inter-integrated circuit (I2C) module configured to perform I2C communication with an external device through a system management bus, a packet generator module configured to transmit a packet to the I2C module through the system management bus, and an I2C controller configured to control operations of the I2C module and the packet generator module. When the I2C module transmits a packet receiving signal to the I2C controller and the I2C controller does not receive the packet receiving signal for a set period of time, the I2C controller may reset the I2C module.

In an exemplary embodiment of the present inventive concept, the computing device may operate as a slave in relation with the external device.

In an exemplary embodiment of the present inventive concept, the I2C module may include a function block including hardware to perform the I2C communication and a data structure including software.

In an exemplary embodiment of the present inventive concept, the function block may include a state machine and a register.

In an exemplary embodiment of the present inventive concept, the I2C controller may reset the state machine, the register, and the data structure when the I2C controller does not receive the packet receiving signal for the set period of time.

In an exemplary embodiment of the present inventive concept, the function block may include a reset pin and the I2C controller may apply a logic high or low value to the reset pin to reset the I2C module.

In an exemplary embodiment of the present inventive concept, the packet generator module may be another I2C module.

In an exemplary embodiment of the present inventive concept, the packet generator module may operate as a master with respect to the I2C module.

In an exemplary embodiment of the present inventive concept, a cycle in which the packet generator module transmits the packet to the I2C module may be shorter than the set period of time in which the I2C controller checks the packet receiving signal transmitted by the I2C module.

In an exemplary embodiment of the present inventive concept, the computing device may include a solid state drive that communicates with the external device through the I2C module and the system management bus.

An exemplary embodiment of the present inventive concept provides a method of recovering a communication error occurring while a computing device including an I2C module communicates with an external device through a system management bus. The method may include transmitting a packet to the I2C module by using a packet generator module; transmitting a packet receiving signal to an I2C controller when the I2C module receives the packet from the packet generator module; checking whether the packet receiving signal is transmitted within a set period of time by using the I2C controller; and resetting the I2C module by using the I2C controller when the packet receiving signal is not transmitted within the set period of time.

The computing device may operate as a slave in relation with the external device.

Resetting the I2C module may include resetting a state machine, a register, and a data structure of the I2C module.

Resetting the I2C module may include applying a logic high or low value to a reset pin of the I2C module.

The computing device may include a solid state drive that communicates with the external device through a sideband interface including the I2C module and the system management bus.

An exemplary embodiment of the present inventive concept provides a computing device including: a first circuit configured to perform I2C communication with an external device through a bus; a second circuit configured to transmit a packet to the first circuit; and a third circuit configured to reset the first circuit when a packet receiving signal sent from the first circuit is not received by the third circuit within a predetermined period of time.

The first circuit may include a reset node for receiving a reset signal from the third circuit.

The third circuit may control the second circuit to transmit the packet to the first circuit.

The bus may include a system management bus.

When the packet receiving signal sent from the first circuit is not received by the third circuit within the predetermined period of time, the bus may be in a hang state.

BRIEF DESCRIPTION OF THE DRAWINGS

The foregoing and other features of the present inventive concept will become more apparent by describing in detail exemplary embodiments thereof, with reference to the accompanying drawings in which.

DETAILED DESCRIPTION OF THE EMBODIMENTS

Exemplary embodiments of the present inventive concept will be described more fully hereinafter with reference to the accompanying drawings. The present inventive concept may, however, be embodied in many different forms and should not be construed as limited to the exemplary embodiments set forth herein.

It will be understood that when an element or layer is referred to as being "on," "connected to" or "coupled to" another element or layer, it can be directly on, connected or coupled to the other element or layer or intervening elements or layers may be present. Like numerals may refer to like elements throughout the application.

Figure 1:
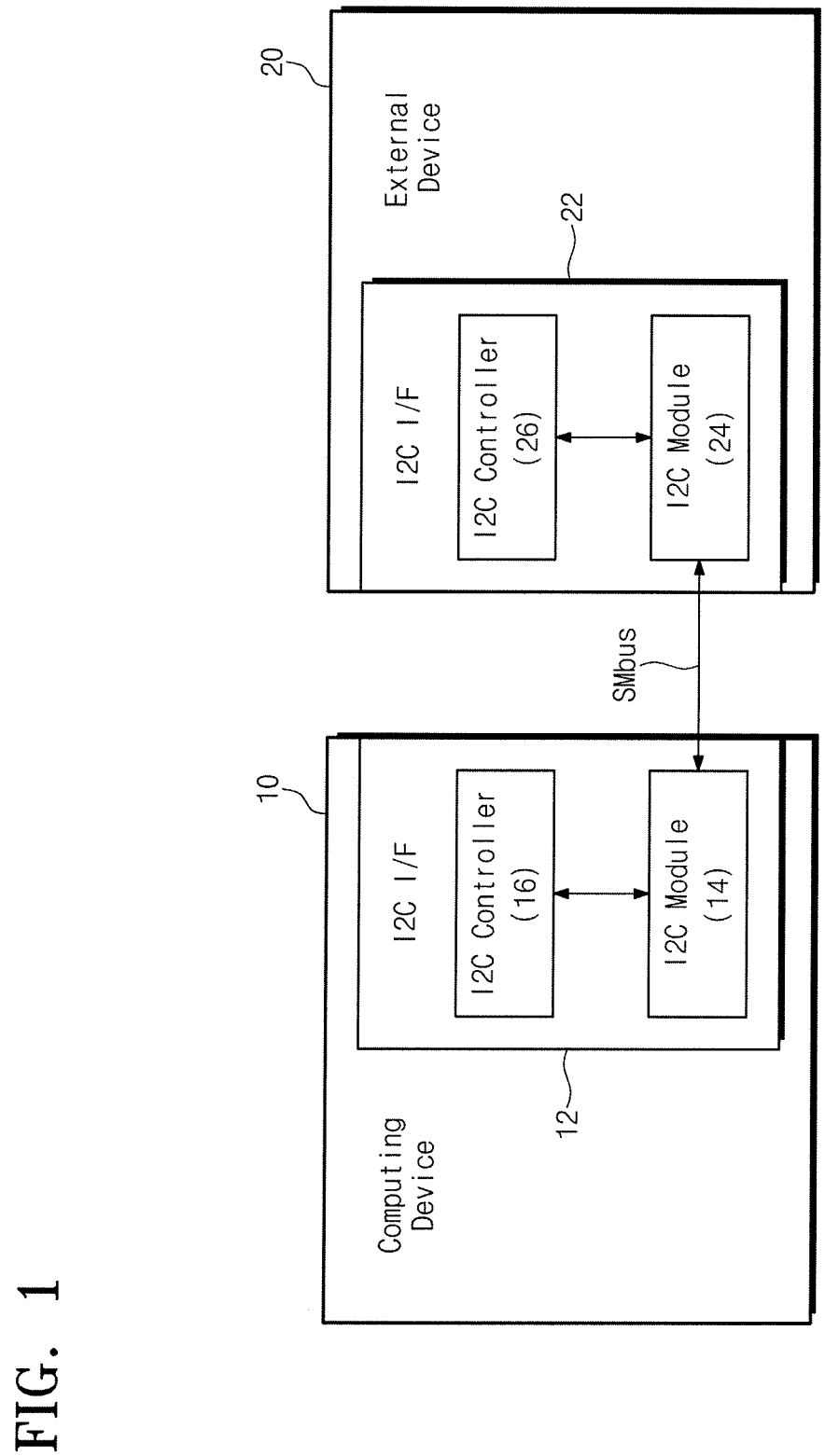
FIG. 1 is a diagram illustrating inter-integrated circuit (I2C) communication between a computing device and an external device.

As used herein, the singular forms "a", "an" and "the" are intended to include the plural forms as well, unless the context clearly indicates otherwise. FIG. 1 is a diagram illustrating inter-integrated circuit (I2C) communication between a computing device 10 and an external device 20. Referring to FIG. 1, when the computing device 10 and the external device 20 communicate with each other using an inter-integrated circuit (I2C) scheme, the external device 20 may operate as a master and the computing device 10 may operate as a slave.

The computing device 10 may include an I2C interface 12 for I2C communication. The I2C interface 12 may include an I2C module 14 connected to the external device 20 through a system management bus SMbus and an I2C controller 16 to control the operation of the IC2 module 14. The I2C module 14 may be connected to the external device 20 through the system management bus SMbus to exchange data with the external device 20.

The external device 20 may include an I2C interface 22 for I2C communication. The I2C interface 22 may include an I2C module 24 and an I2C controller 26 to control the operation of the I2C module 24. The I2C module 24 of the external device 20 may be connected to the computing device 10 through the system management bus SMbus to exchange data with the computing device 10.

When the external device 20 operates as a master and the computing device 10 operates as a slave to exchange data with each other through the system management bus SMbus, an error may occur in the I2C module 14 of the computing device 10 operating as the slave. In other words, a bus hang may occur at the system management bus SMbus. If the I2C module 14 in which the error occurs is not recovered from an error state, other master and slave devices connected to the system management bus SMbus may also not communicate with each other.

Since the computing device 10 operating as the slave may not dominantly control the system management bus SMbus, an occurring error may not be detected and may not be recovered.

In addition, since a reset pin connected to the external device 20 does not exist in the I2C module 14 of the computing device 10, the external device 20 may not reset the I2C module of the computing device 10 in which the error occurs.

As described above, if an error occurs in a device operating as a slave when the computing device 10 and the external device 20 communicate with each other using the I2C scheme, all devices operating in master and slave modes do not recover from an error state. Thus, reliability of communication between the computing device 10 and the external device 20 may be degraded.

Figure 2:
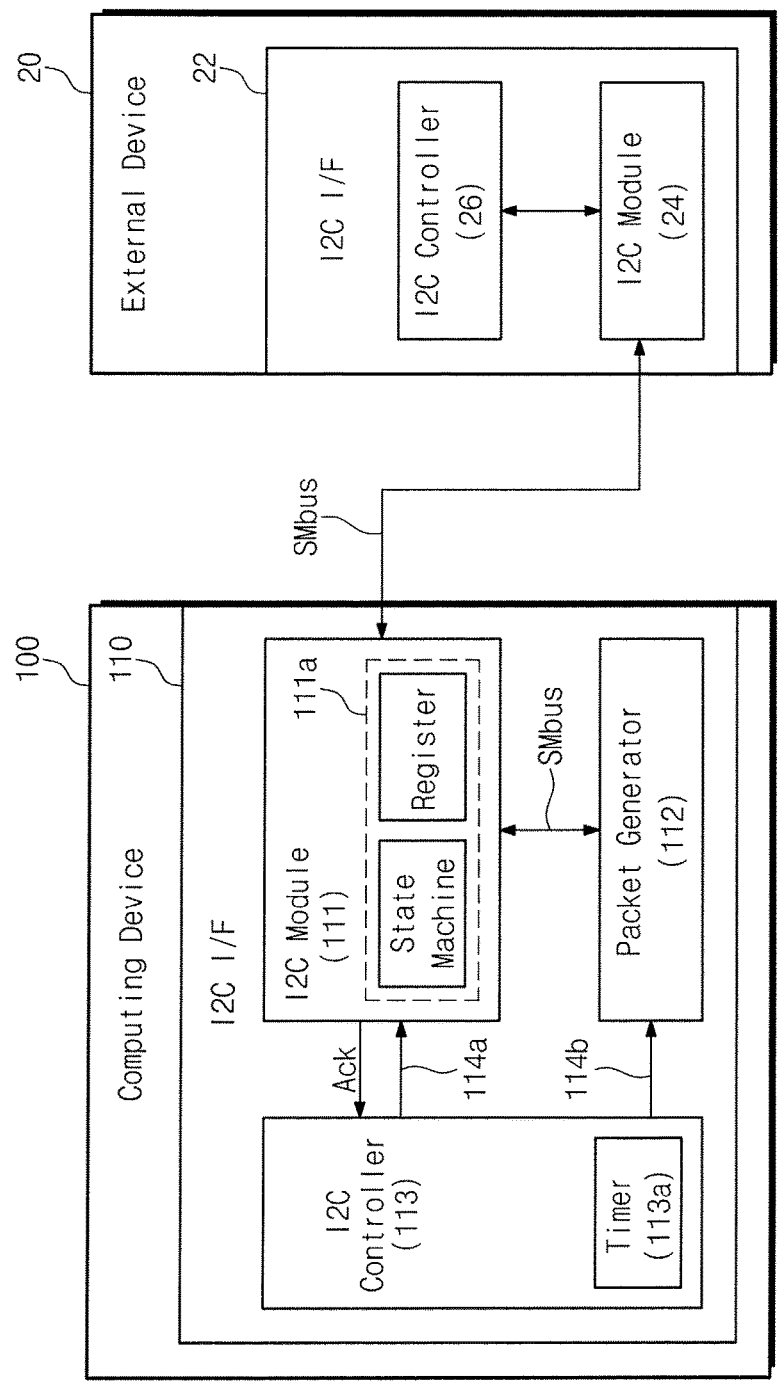
FIG. 2 is a diagram of I2C communication between a computing device according to an exemplary embodiment of the present inventive concept and an external device.

FIG. 2 is a diagram of I2C communication between a computing device 100 according to an exemplary embodiment of the inventive concept and an external device 20. It is to be understood that each element of the computing device 100 and the external device 20 can include a hardware component such as a circuit or a semiconductor device, for example. Referring to FIG. 2, the computing device 100 includes an I2C interface 110 for I2C communication with the external device 20. The I2C interface 110 may include an I2C module 111, a packet generator module 112, and an I2C controller 113. The external device 20 includes an I2C interface 22 for I2C communication with the computing device 100. The I2C interface 22 may include an I2C module 24 and an I2C controller 26. The external device 20, as a host, may operate as a master in relation with the computing device 100. The computing device 100 may operate as a slave in relation with the external device 20.

In an exemplary embodiment of the present inventive concept, the computing device 100 may be applied to a computer that supports I2C communication, a personal computer (PC), an ultra-mobile PC (UMPC), a workstation, a net-book, a personal digital assistant (PDA), a portable computer, a web tablet, a wireless phone, a mobile phone, a digital camera, a digital audio recorder, a digital audio player, a digital video recorder, a digital video player, a device capable of transmitting/receiving information in a wireless environment or one of various electronic devices constituting a home network.

The I2C module 111 of the computing device 100 may connected to the I2C module 24 of the external device 20 through a system management bus SMbus to exchange data with the I2C module 24. In an exemplary embodiment of the present inventive concept, the computing device 100 may operate in a slave mode and the external device 20 may operate in a master mode. Thus, the computing device 100 may receive data or transmit requested data through the I2C module 111 according to the control of the external device 20.

The I2C module 111 may be connected to the I2C module 24 of the external device 20 through the system management bus SMbus. The I2C module 111 may transmit a packet receiving signal Ack to the I2C controller 113 when receiving a packet from the packet generator module 112. In addition, the I2C module 111 may transmit the packet receiving signal Ack to the I2C controller 113 when receiving a packet from one of the external device 20 and the packet generator module 112.

The packet generator module 112 may periodically transmit a set packet to the I2C module 111 according to the control of the I2C controller 113. The I2C module 111 and the package generator module 112 may be connected to each other through the system management bus SMbus. Data of a packet generated by the package generator module 112 may have a small size. The packet generator module 112 may operate as a master in relation with the I2C module 111. In an exemplary embodiment of the present inventive concept, the packet generator module 112 may be another I2C module in the computing device 100. The packet generator module 112 may be implemented with any configuration capable of generating an I2C packet.

The I2C controller 113 may control the packet generator module 112 such that the packet generator module 112 transmits a periodically set packet to the I2C module 111. The I2C controller 113 may receive the packet receiving signal Ack from the I2C module 111. The I2C controller 113 may include a timer 113a that is capable of obtaining a time value. The I2C controller 113 may reset the I2C module 111 with reference to the time value from the timer 113a when it does not receive the packet receiving signal Ack from the I2C module 111 within a set period of time. A reset signal for reset may be sent from the I2C controller 113 to the I2C module 111 via line 114a. Control data may be communicated from the I2C controller 113 to the I2C module 112 via line 114b.

When a communication error occurs in the I2C module 111 during the I2C communication between the external device 20 and the computing device 100, the system management bus SMbus enters a hang state. In other words, other master or slave function blocks connected to the system management bus SMbus may not perform communication through the system management bus SMbus Likewise, when an error occurs in the I2C module 111, the I2C module 111 may not receive a packet from both the I2C module 24 of the external device 20 and the packet generator module 112. Thus, the I2C module 111 may not transmit the packet receiving signal Ack to the I2C controller 113.

The I2C controller 113 checks the packet receiving signal Ack transmitted from the I2C module 111. For example, the I2C controller 113 may determine whether the packet receiving signal Ack is transmitted within a set period of time. The I2C controller 113 performs a reset operation of the I2C module 111 when it does not receive the packet receiving signal Ack within the set period of time.

For example, the I2C controller 113 may reset a hardware component of the I2C module 111 and reset a data structure that is associated with software. The I2C module 111 may include a function block 111a implemented with hardware to perform an I2C operation. The function block 111a may include a state machine and a register.

When the I2C controller 113 resets the I2C module 111 in which an error occurs, the error of the I2C module 111 may be recovered and the system management bus SMbus may get out of a hang state.

As described above, when a bus hang occurs during I2C communication with the external device 20 through the system management bus SMbus, the computing device 100 may detect the bus hang and reset an I2C module in which an error occurs to get out of the bus hang state. Thus, reliability of communication with the external device 20 may be increased.

Figure 3:
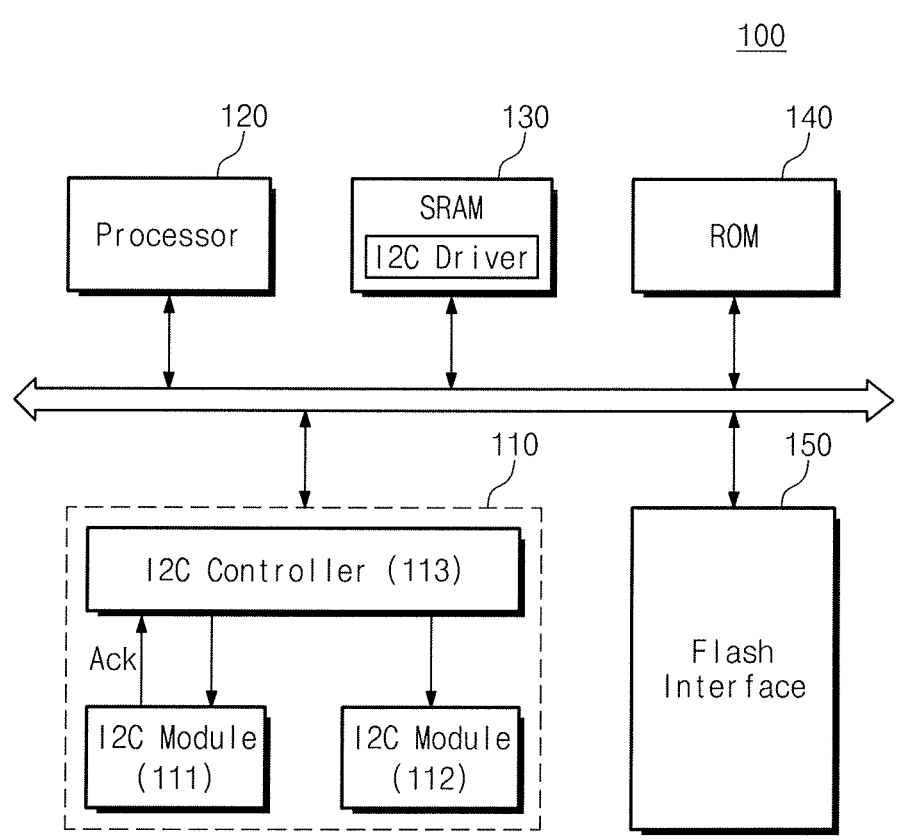
FIG. 3 is a block diagram of the computing device in FIG. 2 according to an exemplary embodiment of the present inventive concept.

FIG. 3 is a block diagram of the computing device 100 in FIG. 2. As illustrated in FIG. 3, the computing device 100 may include an I2C interface 110, a processor 120, a static random access memory (SRAM) 130, a read only memory (ROM) 140, and a flash interface 150. The I2C interface 110 may include I2C modules 111 and 112 and an I2C controller 113. The I2C modules 111 and 112 may communicate with other I2C modules in the external device 20 (see FIG. 2) or the computing device 100 through the system management bus SMbus according to the control of the I2C controller 113.

The processor 120 may control the overall operation of the computing device 100. The SRAM 130 may be used as a cache memory, a main memory or the like of the computing device 100. The ROM 140 may store various information used to operate the computing device 100 in the form of firmware. In an exemplary embodiment of the present inventive concept, data, information or firmware stored in the SRAM 130 or the ROM 140 may be managed or executed by the processor 120. In an exemplary embodiment of the present inventive concept, an I2C driver for performing the foregoing operation of the I2C controller 113 and a data structure of the I2C modules 111 and 112 may be stored in the ROM 140. In an exemplary embodiment of the present inventive concept, the data structure may be managed by firmware.

The foregoing operations of the I2C controller 113, e.g., detecting an error of an I2C module and resetting the I2C module in which the error occurs may be performed by loading the I2C driver stored in the ROM 140 in the SRAM 130. For example, when the computing device 100 is booted, the processor 120 may load the I2C driver stored in the ROM 140 in the SRAM 130. The I2C controller 113 may perform the foregoing operation by driving the loaded I2C driver.

The I2C controller 113 may control the operations of first and second I2C modules 111 and 112 to perform I2C communication with the external device 20. The I2C controller 113 may control the second I2C module 112 such that the second I2C module 112 periodically transmits a set packet to the first I2C module 111. The I2C controller 113 may transmit read data to the external device 20 through the first I2C module 111 when receiving a data read request from the external device 20 through a system management bus. The I2C controller 113 may control the first I2C module 111 to transmit received data to a memory on which a write operation is to be performed when receiving a data write request from the external device 20 through the system management bus.

The first I2C module 111 may transmit the packet receiving signal Ack to the I2C controller 113 when receiving a packet from the second I2C module 112. The second I2C module 112 may operate as the packet generator module 112 in FIG. 2.

The I2C controller 113 may reset hardware components of the first I2C module 111 and reset a data structure that is associated with software. The first I2C module 111 may include a state machine that is a hardware component, registers, and a data structure that is software. In other words, the I2C controller 113 may reset hardware and software configurations of the first I2C module 111 to recover the first I2C module 111 in which an error occurs from an error state.

In an exemplary embodiment of the present inventive concept, the hardware component of the first I2C module 111 may include a reset pin. In this case, the I2C controller 113 may apply a logic high or low value to the reset pin to perform a reset operation.

Figure 4:
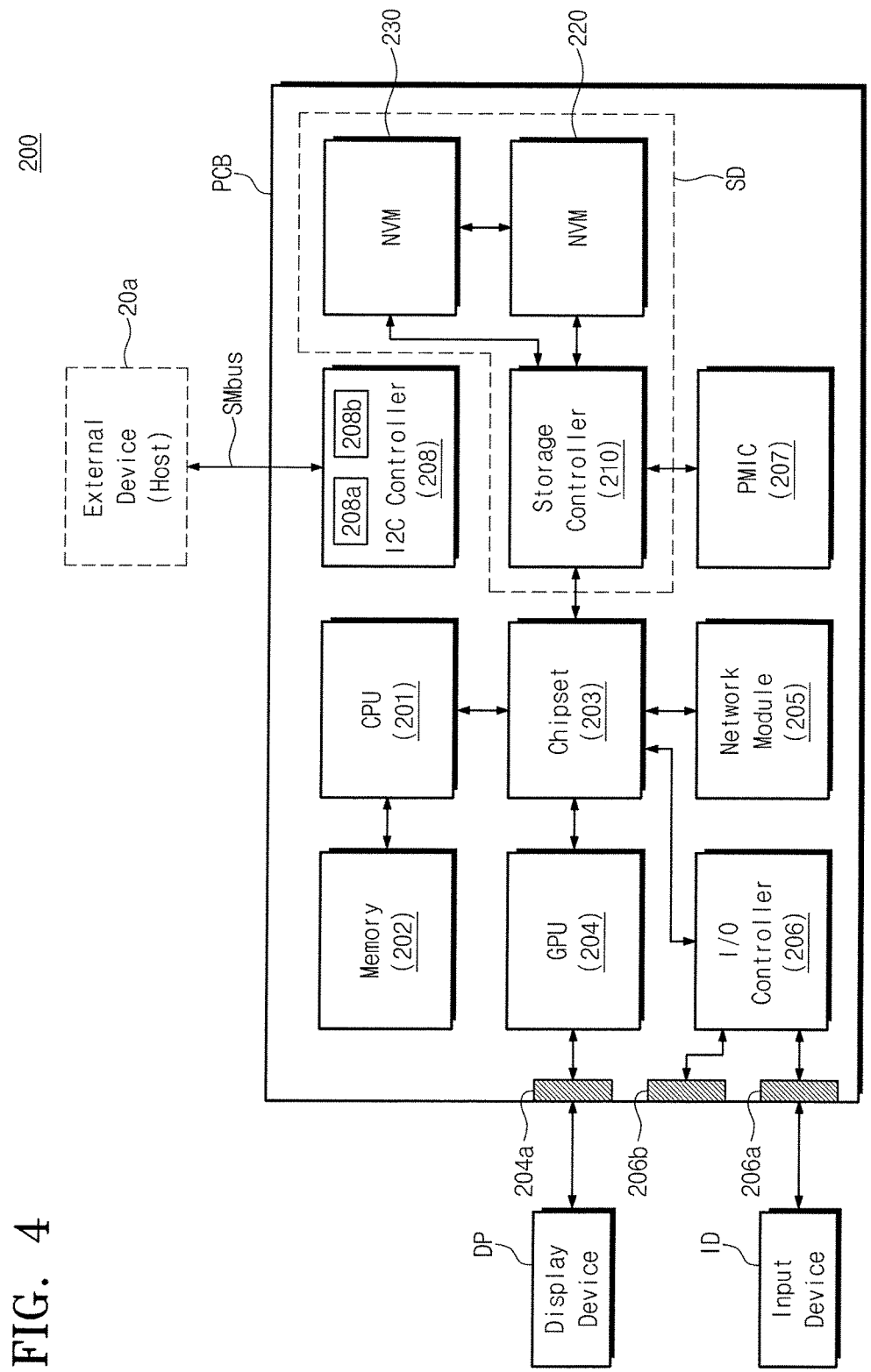
FIG. 4 is a diagram of a computing device according to an exemplary embodiment of the present inventive concept.

FIG. 4 is a block diagram of a computing device 200 according to an exemplary embodiment of the present inventive concept. As illustrated in FIG. 4, the computing device 200 may include a printed circuit board (PCB), a display device (DP), and an input device (ID).

The PCB may be a mother board or a mainboard of the computing device 200. Various hardware used to operate the computing device 200 may be mounted on the PCB. In an exemplary embodiment of the present inventive concept, the PCB may include regions in which various hardware components such as a semiconductor chip, a semiconductor package, a passive element, an active element, a control circuit, and an electronic circuit may be mounted. For example, a storage controller 210 and first and second nonvolatile memory (NVM) devices 220 and 230 may be mounted on a dedicated region provided on the PCB.

The PCB may include various interconnections. The various interconnections may electrically connect hardware components mounted on the PCB to each other. The hardware components mounted on the PCB may communicate with each other through the various interconnections.

A storage device SD, a central processing unit (CPU) 201, a memory 202, a chipset 203, a graphic processing unit (GPU) 204, a network module 205, an input/output controller (I/O controller) 206, a plurality of input/output sockets (I/O sockets) 206a and 206b, a power management integrated circuit (PMIC) 207, and an I2C controller 208 may be mounted on respective regions provided on the PCB.

The storage device SD includes the storage controller 210 and the first and second nonvolatile memory devices 220 and 230. The storage controller 210 may control the first and second nonvolatile memory devices 220 and 230 according to the control of the CPU 201. For example, the storage controller 210 may read data stored in the first and second nonvolatile memory devices 220 and 230 or store data in the first and second nonvolatile memory devices 220 and 230 according to the control of the CPU 201. In an exemplary embodiment of the present inventive concept, the storage controller 210 may communicate with the CPU 201 through the chipset 203.

The first and second nonvolatile memory devices 220 and 230 may operate according to the control of the storage controller 210. In an exemplary embodiment of the present inventive concept, the first and second nonvolatile memory devices 220 and 230 may be implemented with various nonvolatile memory devices such as an electrically erasable and programmable ROM (EPROM), a NAND flash memory, a NOR flash memory, a phase change RAM (PRAM), a resistive RAM (ReRAM), a ferroelectric RAM (FRAM), and a spin-transfer torque magnetic RAM (STT-MRAM). For brevity of description, an example will be described where each of the first and second nonvolatile memory devices 220 and 230 is a NAND flash memory device.

In an exemplary embodiment of the present inventive concept, the storage device SD may be used as a high-capacity storage medium. As described above, the storage controller 210 and the first and second nonvolatile memory devices 220 and 230 of the storage device SD may be mounted on the PCB of the computing device 200. In other words, the storage device SD may be an on-board storage medium or an on-board solid state drive (SSD).

The CPU 201 may perform the overall operations used to operate the computing device 200. For example, the CPU 201 may interpret a command input from a user and perform an operation or process data based on the interpreted command. The CPU 201 may output a result of the operation or the processed data.

The memory 202 may be used as a main memory of the computing device 200. The memory 202 may include a volatile random access memory such as a Dynamic RAM (DRAM), a Synchronous DRAM (SDRAM), a Double Data Rate SDRAM (DDR SDRAM), a DDR2 SDRAM, a DDR3 SDRAM, a Low Power SDRAM (LPDDR SDRAM), an LPDDR2 SDRAM, and an LPDDR3 SDRAM or a nonvolatile random access memory such as a PRAM, a Magnetic RAM (MRAM), an ReRAM, and an FRAM. In an exemplary embodiment of the present inventive concept, the memory 202 may be mounted on the PCB and connected to the CPU 201 through the interconnections provided at the PCB.

The chipset 203 may be a device to control various hardware components included in the computing device 200 according to the control of the CPU 201. For example, the chipset 203 may control the storage device SD, the GPU 204, the network module 205, and the input/output controller 206 according to the control of the CPU 201. In an exemplary embodiment of the present inventive concept, the chipset 203 may be mounted on the PCB and may be electrically connected to various hardware through interconnections provided at the PCB. In an exemplary embodiment of the present inventive concept, the chipset 203 may communicate with each of the various hardware via a predetermined interface. In an exemplary embodiment of the present inventive concept, the predetermined interface may include at least one of various interfaces such as universal serial bus (USB), multimedia card (MMC), embedded-MMC, peripheral component interconnection (PCI), PCI express, advanced technology attachment (ATA), serial-ATA, parallel-ATA, small computer system interface (SCSI), enhanced small disk interface (ESDI), integrated drive electronics (IDE), Firewire, and universal flash storage (UFS).

The GPU 204 may convert the data processed by the CPU 201 or the result of an operation into an image signal. The converted image signal may be output by the display device DP. In an exemplary embodiment of the present inventive concept, the GPU 204 may be mounted on the PCB and may be connected to the chipset 203 and a connector 204a through interconnections provided on the PCB. The GPU 204 may be included in the CPU 201. In an exemplary embodiment of the present inventive concept, the connector 204a may be connected to the display device DP.

The network module 205 supports wired or wireless communication with external devices. For example, the network module 205 may support wired or wireless communication such as Code Division Multiple Access (CDMA), Global System for Mobile communication (GSM), wideband CDMA (WCDMA), CDMA-2000, Time Division Multiple Access (TDMA), Long Term Evolution (LTE), Wimax, Wireless Local Area Network (WLAN), Ultra-Wideband (UWB), Bluetooth, and Wireless Display (WI-DI). In an exemplary embodiment of the present inventive concept, the network module 205 may be mounted on the PCB and may be connected to the chipset 203 through the interconnections provided on the PCB.

The I/O controller 206 may process information input from the input device ID included in the computing device 200 or may control the connectors 206a and 206b. In an exemplary embodiment of the present inventive concept, the I/O controller 206 may be connected to the external connectors 206a and 206b and may manage the external connectors 206a and 206b. In an exemplary embodiment of the present inventive concept, the I/O controller 206 may be mounted on the PCB and may be connected to the connectors 206a and 206b through interconnections provided at the PCB.

In an exemplary embodiment of the present inventive concept, the connectors 206a and 206b may include input/output terminals such as a PS/2 port, a PCI slot, a dual in-line memory module (DIMM) slot, a USB terminal, a red, green and blue (RGB) port, a digital visual interface (DVI) port, and a high-definition multimedia interface (HDMI) port. In an exemplary embodiment of the present inventive concept, the connectors 206a and 206b may be mounted on the PCB.

The power management integrated circuit (PMIC) 207 may supply power to various hardware of the computing device 200 based on externally supplied power. In some cases, the power management integrated circuit (PMIC) 207 may supply power only for the storage device SD and may be integrated in the storage controller 210.

The I2C controller 208 may include first and second I2C modules 208a and 208b for communication with a host. The first I2C module 208a, the second I2C module 208b, and an external device 20a may be connected to each other through a system management bus SMbus.

The external device 20a may operate as a host and the first I2C module 208a may operate as a slave to perform I2C communication. The external device 20a may be connected to the storage controller 210 through an I2C module. The external device 20a may be connected to the storage controller 210 to test various functions of an on-board SSD. In an exemplary embodiment of the present inventive concept, the external device 20a may be a debugger device to debug an on-board SSD. In an exemplary embodiment of the present inventive concept, the external device 20a may be connected to the storage controller 210 through a sideband interface to communicate with the storage controller 210. The sideband interface may include an I2C module and a system management bus.

The second I2C module 208b may periodically transmit a set packet to the first I2C module 208a according to the control of the I2C controller 208. The I2C controller 208 may check whether the first I2C module 208a receives a packet from any one of the external device 20a and the second I2C module 208b within a set period of time. A cycle in which the second I2C module 208b transmits the set packet to the first I2C module 208a may be shorter than a set period of time in which the I2C controller 208 checks whether a packet is transmitted.

When the first I2C module 208a does not receive a packet within the set period of time, the I2C controller 208 resets the first I2C module 208a. For example, the I2C controller 208 may reset all hardware and software components of the first I2C module 208a, as described above.

According to the above-described exemplary embodiments, the computing device 200 may increase communication reliability during I2C communication with an external device.

Figure 5:
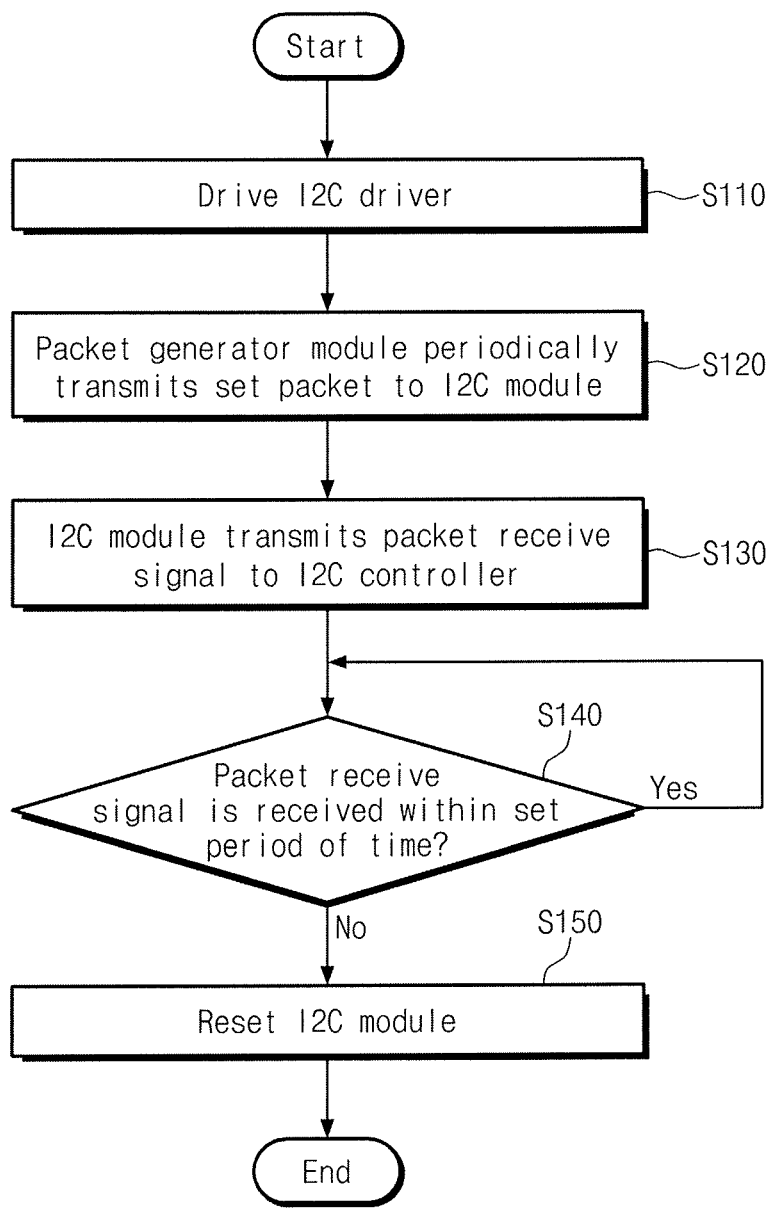
FIG. 5 is a flowchart of a communication error recovery method of a computing device according to an exemplary embodiment of the present inventive concept.

FIG. 5 is a flowchart of a communication error recovery method of a computing device 100 according to an exemplary embodiment of the present inventive concept. The computing device 100 may detect an I2C module in which an error occurs during I2C communication with an external device and reset the I2C module to get out of an error state. Hereinafter, a communication error recovery method of the computing device 100 according to exemplary embodiments of the present inventive concept will now be described in detail with reference to FIGS. 3 and 5.

When the computing device 100 is booted, an I2C driver is loaded in the SRAM 130 by the processor 120 to be driven (S110). The I2C driver may be driven to perform the above-described operation of the I2C controller 113. In other words, the I2C driver may be driven to perform the error recovery method.

The packet generator module 112 may transmit any packet to the I2C module 111 at a set cycle according to the control of the I2C controller 113 (S120). In other words, the packet generator module 112 may periodically transmit a set packet to the I2C module 111.

The I2C module 111 transmits a packet receiving signal Ack to the I2C controller 113 when it receives the packet from the packet generator module 112 (S130).

The I2C controller 113 checks whether the packet receiving signal Ack is transmitted from the I2c module 111 for a set period of time (S140). In other words, the I2C controller 113 checks to see if the packet receiving signal Ack has been received within the set period of time.

The I2C controller 113 may reset the I2C module 111 when it does not receive the packet receiving signal Ack from the I2C module 111 for the set period of time (S150). If the I2C controller 113 does receive the packet receiving signal Ack within the set period of time, (S140) may be repeated.

According to the above-described communication error recovery method of a computing device, when an error occurs in an I2C module during I2C communication with an external device, the error may be detected and the I2C module may be reset to recover the error. Thus, reliability of the I2C communication between the computing device and the external device may be increased.

Figure 6:
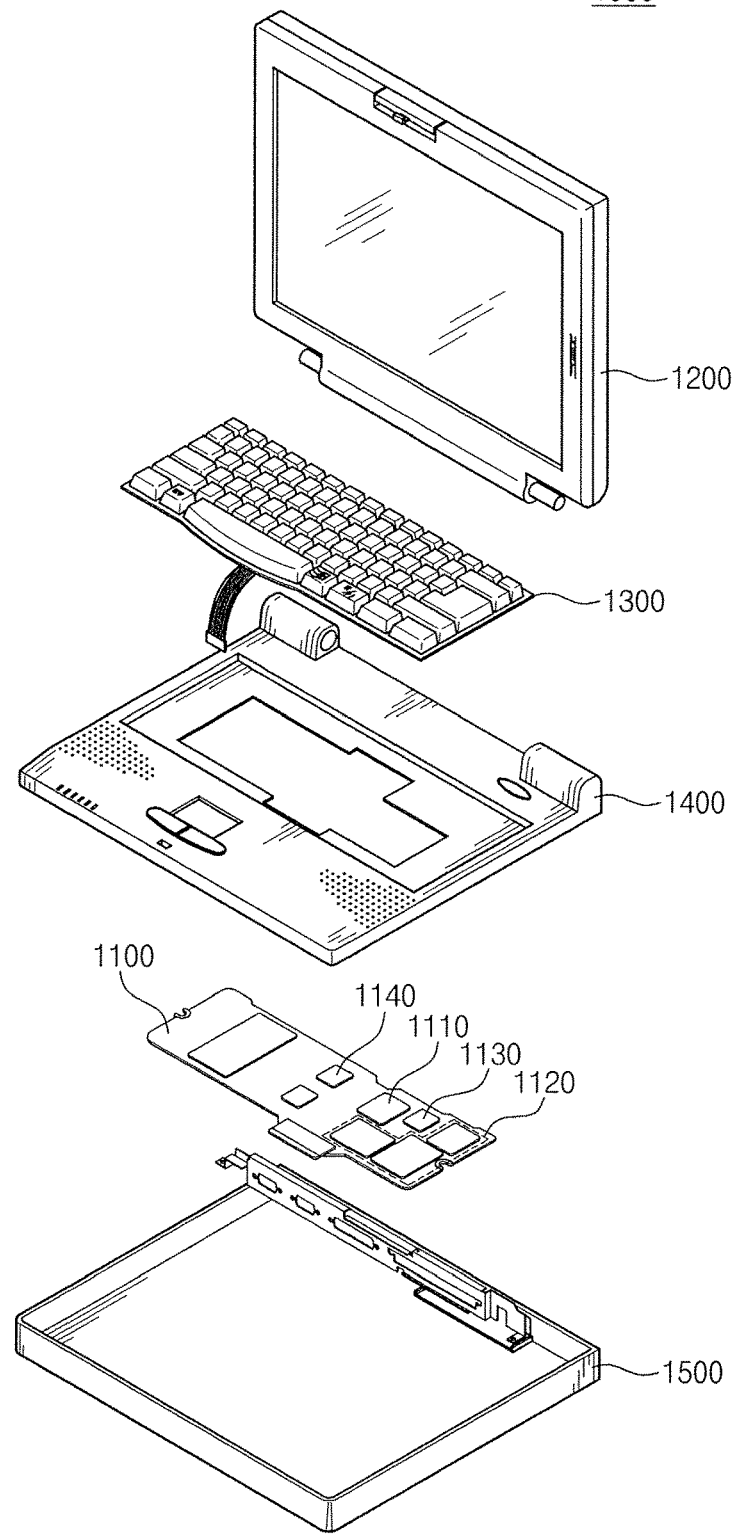
FIG. 6 is a diagram of a computing device to which an I2C controller according to an exemplary embodiment of the present inventive concept is applied.

FIG. 6 is a diagram of a computing device 1000 to which an I2C controller according to an exemplary embodiment of the present inventive concept is applied. In an exemplary embodiment of the present inventive concept, the computing device 1000 may be a laptop computer. As illustrated in FIG. 6, the computing device 1000 includes a main board 1100, a monitor 1200, a keyboard 1300, a top plate 1400, and a bottom plate 1500.

The monitor 1200 may be provided on a surface of the top plate 1400 and may be connected to the mainboard 1100 through a flexible PCB. The monitor 1200 may output an image signal provided from the mainboard 1100.

The keyboard 1300 may be disposed on the top plate 1400 and may be connected to the mainboard 1100 through the flexible PCB.

The mainboard 1100 may be provided between the top plate 1400 and the bottom plate 1500. As described above, the mainboard 1100 may include various hardware used to operate the computing device 1000. For example, a semiconductor package such as a central processing unit (CPU) 1110, a storage device 1120, a memory 1130, and an I2C controller 1140 according to exemplary embodiments of the present inventive concept and a hardware circuit, and the like may be mounted on the mainboard 1100.

In an exemplary embodiment of the present inventive concept, the storage device 1120 may be an on-board SSD. The storage device 1120 may be connected to an external device through an I2C module of the I2C controller 1140 to perform various operations. In an exemplary embodiment of the present inventive concept, the storage device 1120 may perform operations such as self-diagnosis and operation performance verification.

When an error occurs in an I2C module while the computing device 1000 including an I2C controller according to exemplary embodiments of the present inventive concept is connected to an external device through an I2C module to perform various operations, the computing device 1000 resets the I2C module to be recovered from an error state. Thus, reliability of communication with the external device may be increased.

Figure 7:
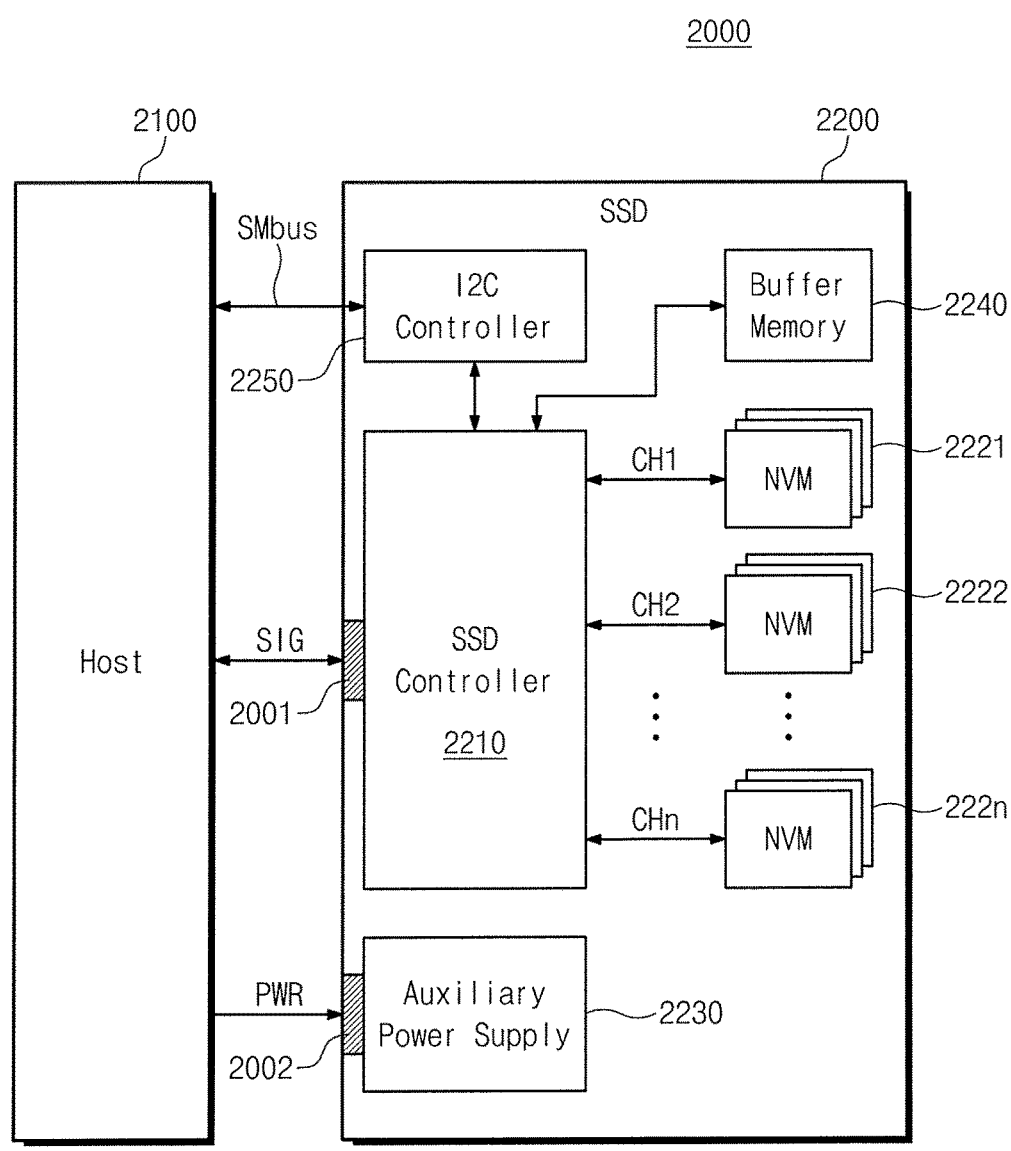
FIG. 7 is a block diagram of a solid state drive (SSD) system including an I2C controller according to an exemplary embodiment of the present inventive concept.

FIG. 7 is a block diagram of an SSD system 2000 including an I2C controller according to an exemplary embodiment of the present inventive concept. As illustrated in FIG. 7, the SSD system 2000 may include a host 2100 and an SSD 2200. The SSD 2200 transmits/receives a signal SIG to/from the host 2100 via a signal connector 2001 and receives power PWR via a power connector 2002. The SSD 2200 includes an SSD controller 2210, a plurality of flash memories 2221 to 222n, an auxiliary power supply 2230, a buffer memory 2240, and an I2C controller 2250.

The SSD controller 2210 may control the flash memories 2221 to 222n in response to the signal SIG received from the host 2100. Signals transmitted between the SSD controller 2210 and the flash memories 2221 to 222n pass through channels CH1 to CHn. The flash memories 2221 to 222n may perform a program operation according to the control of the SSD controller 2210.

The auxiliary power supply 2230 is connected to the host 2100 via the power connector 2002. The auxiliary power supply 2230 may receive the power PWR from the host 2100 so that the auxiliary power supply 2230 can be charged. The auxiliary power supply 2230 may supply power of the SSD system 2000 when power is not sufficiently supplied from the host 2100. In an exemplary embodiment of the present inventive concept, the auxiliary power supply 2230 may be disposed inside or outside the SSD 2200. For example, the auxiliary power supply 2230 may be disposed at a main board and may supply auxiliary power to the SSD 2200.

The buffer memory 2240 operates as a buffer memory of the SSD 2200. For example, the buffer memory 2240 may temporarily store data received from the host 2100 or data received from the flash memories 2221 to 222n or may temporarily store metadata (e.g., a mapping table) of the flash memories 2221 to 222n. The buffer memory 2240 may include a volatile memory such as DRAM, SDRAM, DDR SDRAM, LPDDR SDRAM, and SRAM or a nonvolatile memory such as FRAM ReRAM, STT-MRAM, and PRAM.

In an exemplary embodiment of the present inventive concept, components included in the SSD system 2000 may be implemented with semiconductor packages, respectively, and each of the semiconductor packages may be mounted on a PCB. After each of the semiconductor packages is mounted on the PCB, the SSD system 2000 may perform various performance verification operations through the I2C controller 2250 under the control of the host 2100. The host 2100 and I2C controller 2250 are connected via a system management bus SMbus.

When an error occurs in an I2C module while the SSD system 2000 including an I2C controller according to an exemplary embodiment of the present inventive concept is connected to an external device through an I2C module to perform various performance verification operations, the SSD system 2000 can reset the I2C module to be recovered from an error state. Thus, reliability of communication with the external device may be increased.

Figure 8:
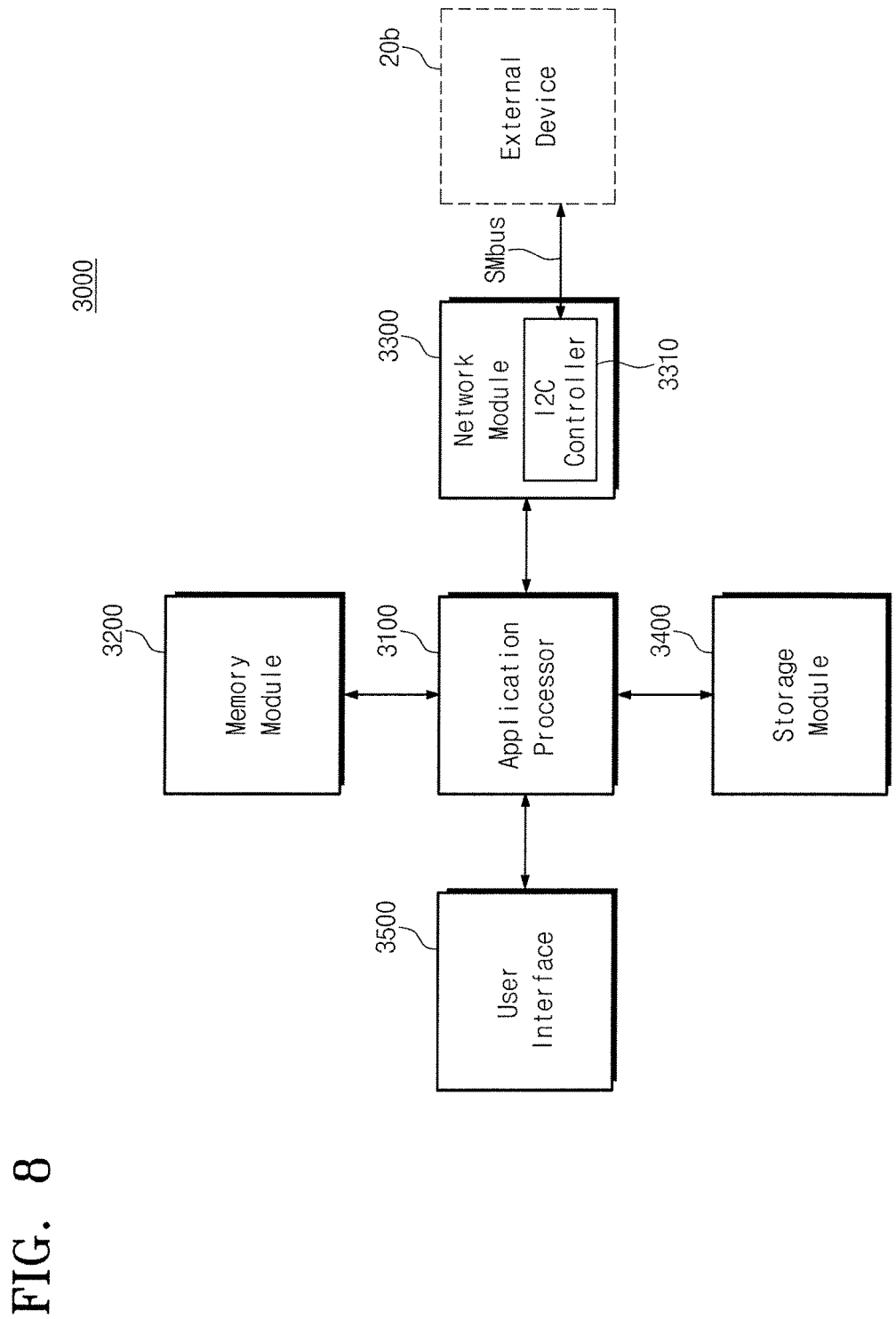
FIG. 8 is a block diagram of a user system to which an I2C controller according to an exemplary embodiment of the present inventive concept is applied.

FIG. 8 is a block diagram of a user system 3000 to which an I2C controller according to an exemplary embodiment of the present inventive concept is applied. As illustrated in FIG. 8, the user system 3000 includes an application processor 3100, a memory module 3200, a network module 3300, a storage module 3400, and a user interface 3500.

The application processor 3100 may drive components in the user system 3000 and an operating system (OS). In an exemplary embodiment of the present inventive concept, the application processor 3100 may include controllers to control components in the user system 3000, interfaces, a graphic engine, and the like. The application processor 3100 may be provided as a system-on-chip (SoC).

The memory module 3200 may operate as a main memory, a working memory, a buffer memory or a cache memory of the user system 3000. The memory module 3200 may include a volatile random access memory such as DRAM, SDRAM, DDR SDRAM, DDR2 SDRAM, DDR3 SDRAM, LPDDR DRAM, LPDDR2 DRAM, LPDDR3, and DRAM and a nonvolatile random access memory such as PRAM, ReRAM, MRAM, and FRAM. In an exemplary embodiment of the present inventive concept, the memory module 3200 and the application processor 3100 may be packed using a package-on-package (PoP).

The network module 3300 may communicate with external devices. In FIG. 8, one external device 20b is shown. In an exemplary embodiment of the present inventive concept, the network module 3300 may support wireless communication such as CDMA, GSM, WCDMA, CDMA-2000, TDMA, LTE, Wimax, WLAN, UWB, Bluetooth, and WI-DI. In an exemplary embodiment of the present inventive concept, the network module 3300 may be included in the application processor 3100.

The storage module 3400 may store data. For example, the storage module 3400 may store data received from the application processor 3100. In addition, the storage module 3400 may transmit its stored data to the application processor 3100. In an exemplary embodiment of the present inventive concept, the storage module 3400 may be implemented using a semiconductor memory device such as a PRAM, an MRAM, an ReRAM, a NAND flash memory, a NOR flash memory, and a three-dimensional NAND flash memory.

In an exemplary embodiment of the present inventive concept, the storage module 3400 may be an on-board SSD. The storage module 3400 may be mounted on a separate PCB and may be connected to the external device 20b through an I2C controller 3310 according to an exemplary embodiment of the present inventive concept to perform function check and self-diagnosis operations according to the control of the external device 20b.

When an error occurs in an I2C module included in the I2C controller 3310 while the user system 3000 including the I2C controller 3310 is connected to the external device 20a through the I2C controller 3310 via a system management bus SMbus to perform various performance verification operations, the user system 3000 resets the I2C module to be recovered from an error state. Thus, reliability of communication with the external device 20b may be increased.

The user interface 3500 may include interfaces to input data or a command to the application processor 3100 or output data to the external device 20b. For example, the user interface device 3500 may include user input interfaces such as a keyboard, a keypad, a button, a touch panel. a touch screen, a touch ball, a touch pad. a camera, a gyroscope sensor, a vibration sensor, and a piezoelectric element. The user interface device 3500 may include user output interfaces such as a liquid crystal display (LCD) an organic light emitting diode (OLED) display, an active matrix OLED (AMOLED) display, a light emitting diode (LED), a speaker, and a According to the foregoing exemplary embodiments, a computing device including an I2C controller may be connected to an external device through a system management bus to perform I2C communication. When a communication error occurs in the I2C module of the computing device connected to the external device during the I2C communication, the I2C controller may detect the error and reset the I2C module to get out of an error state. Thus, the computing device according to exemplary embodiments of the present inventive concept may increase communication reliability during I2C communication with the external device.

For example, a computing device according to an exemplary embodiment of the present inventive concept may detect an error that occurs during I2C communication with an external device in a slave mode and recover the error. Thus, communication reliability of the computing device may be increased.

While the present inventive concept has been particularly shown and described with reference to exemplary embodiments thereof, it will be understood by those of ordinary skill in the art that various changes in form and details may be made thereto without departing from the scope of the present inventive concept as defined by the following claims.

What is claimed is:

1. A computing device, comprising:
an inter-integrated circuit (I2C) interface, the I2C interface including:
an I2C module configured to perform I2C communication with an I2C interface of an external device through a system management bus;
a packet generator module configured to transmit a packet to the I2C module through the system management bus; and
an I2C controller configured to control operations of the I2C module and the packet generator module,
wherein the I2C module includes a state machine and a register,
wherein when the I2C controller does not receive a packet receiving signal from the I2C module for at least one of various lengths of time in which bus hangs respectively occur on the system management bus for one of the operations controlled by the I2C controller, the I2C controller resets the I2C module by transmitting a reset signal to the I2C module to reset the state machine and the register to get out of the bus hang state.

2. The computing device as set forth in claim 1, wherein the computing device operates as a slave in relation with the external device.

3. The computing device as set forth in claim 1, wherein the I2C module includes a function block including hardware to perform the I2C communication and a data structure including software.

4. The computing device as set forth in claim 3, wherein the function block includes the state machine and the register.

5. The computing device as set forth in claim 4, wherein the I2C controller further resets the data structure when the I2C controller does not receive the packet receiving signal for at least one of the various lengths of time.

6. The computing device as set forth in claim 4, wherein the function block includes a reset pin and the I2C controller applies a logic high or low value to the reset pin to reset the I2C module.

7. The computing device as set forth in claim 1, wherein the packet generator module is another I2C module.

8. The computing device as set forth in claim 7, wherein the packet generator module operates as a master with respect to the I2C module.

9. The computing device as set forth in claim 1, wherein a cycle in which the packet generator module transmits the packet to the I2C module is shorter than at least one of the various lengths of time in which the I2C controller checks the packet receiving signal transmitted by the I2C module.

10. The computing device as set forth in claim 1, further comprising a solid state drive that communicates with the external device through the I2C module and the system management bus.

11. A method of recovering a communication error occurring while a computing device including an inter-integrated circuit (I2C) interface communicates with an I2C interface of an external device through a system management bus, the method comprising:
transmitting a packet to an I2C module of the I2C interface of the computing device by using a packet generator module of the I2C interface of the computing device;
periodically transmitting a packet receiving signal to an I2C controller of the I2C interface of the computing device when the I2C module receives the packet from the packet generator module; and
resetting a state machine and a register of the I2C module by using the I2C controller when one of the packet receiving signals is not received within at least one of various lengths of time in which bus hangs respectively occur on the system management bus for one of a plurality of operations controlled by the I2C controller, wherein the I2C controller resets the state machine and the register to get out of the bus hang state by transmitting a reset signal to the I2C module.

12. The method as set forth in claim 11, wherein the computing device operates as a slave in relation with the external device.

13. The method as set forth in claim 11, wherein a data structure of the I2C module is reset when the state machine and the register are reset.

14. The method as set forth in claim 11, wherein resetting the state machine and the register of the I2C module includes applying a logic high or low value to a reset pin of the I2C module.

15. The method as set forth in claim 11, wherein the computing device includes a solid state drive that communicates with the external device through a sideband interface including the I2C module and the system management bus.

16. A computing device, comprising:
an inter-integrated (I2C) interface including:
a first I2C module configured to perform I2C communication with an I2C interface of an external device through a bus, wherein the first I2C module includes a state machine and a register;
a second I2C module configured to transmit a packet to the first I2C module; and
a I2C controller configured to reset the first I2C module when a packet receiving signal sent from the first I2C module is not received by the I2C controller within at least one of various lengths of time in which bus hangs respectively occur on the bus for one of a plurality of operations controlled by the I2C controller, wherein the I2C controller resets the first I2C module by transmitting a reset signal to the first I2C module to reset the state machine and the register to get out of the bus hang state.

17. The computing device of claim 16, wherein the first I2C module includes a reset node for receiving the reset signal from the I2C controller.

18. The computing device of claim 16, wherein the I2C controller controls the second I2C module to transmit the packet to the first I2C module.

19. The computing device of claim 16, wherein the bus includes a system management bus.

* * * * *